(12) United States Patent
Raiser

(10) Patent No.: US 6,381,551 B1
(45) Date of Patent: Apr. 30, 2002

(54) METHOD FOR PROVIDING AN OUTPUT SIGNAL HAVING A DESIRED VALUE OF A CHARACTERISTIC QUANTITY AT THE OUTPUT OF A SWITCHED-MODE POWER SUPPLY UNIT AND CIRCUIT FOR CARRYING OUT THE METHOD

(75) Inventor: Franz Raiser, Munich (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/379,584

(22) Filed: Aug. 24, 1999

(30) Foreign Application Priority Data

Sep. 23, 1998 (DE) .......................... 198 43 678

(51) Int. Cl.⁷ ............................................. G01R 35/00
(52) U.S. Cl. ...................... 702/107; 702/198; 363/41; 315/194; 315/224; 315/308
(58) Field of Search ................................ 702/107, 117, 702/189, 198; 315/224, 136, 194, 308, 362; 363/39, 41; 362/364, 373, 580, 581; 324/601; 327/100

(56) References Cited

U.S. PATENT DOCUMENTS

| 5,537,006 A | * | 7/1996 | Wilson et al. | 315/136 |
| 5,740,021 A | * | 4/1998 | Lecheler et al. | 315/224 |
| 5,961,203 A | * | 10/1999 | Schuda | 362/264 |

\* cited by examiner

*Primary Examiner*—Marc S. Hoff
*Assistant Examiner*—Hien Vo
(74) *Attorney, Agent, or Firm*—Carlo S. Bessone

(57) ABSTRACT

The present invention relates to a method for providing an output signal ($U_a$) having a desired value of a characteristic quantity ($U_{arms}$) at the output of a switched-mode power supply unit. At least one low-voltage lamp is connected to the output of the switched-mode power supply unit. A load current ($I_L$) corresponds to the sum of the currents ($I_1$, $I_2$) flowing through all the low-voltage lamps. The input side the switched-mode power supply unit is driven by an input signal ($U_{e1}$, $U_{e2}$) having at least one variable characteristic quantity (PW), and the switched-mode power supply unit is connected to an operating voltage ($U_B$).

15 Claims, 2 Drawing Sheets

METHOD FOR PROVIDING AN OUTPUT SIGNAL HAVING A DESIRED VALUE OF A CHARACTERISTIC QUANTITY AT THE OUTPUT OF A SWITCHED-MODE POWER SUPPLY UNIT AND CIRCUIT FOR CARRYING OUT THE METHOD

Method for providing an output signal having a desired value of a characteristic quantity at the output of a switched-mode power supply unit and circuit for carrying out the method

FIELD OF THE INVENTION

The present invention relates to a method for providing an output signal having a desired value of a characteristic quantity at the output of a switched-mode power supply unit, at least one low-voltage lamp being connected to the output of the switched-mode power supply unit, and also to a circuit for carrying out the method.

BACKGROUND OF THE INVENTION

The problems addressed by the present invention will be described using the example of the circuit arrangement known from the prior art and shown in FIG. 1. In order to operate low-voltage lamps, for example incandescent halogen lamps 10, 12, they are connected individually or in a parallel arrangement to the output terminals of a switched-mode power supply unit 14. The switched-mode power supply unit 14 is connected to an operating voltage $U_B$, for example the mains voltage. The inputs 16, 18 of the switched-mode power supply unit 14 are connected to a drive circuit 20, which provides in-antiphase, pulse width-modulated squarewave signals $U_{e1}$, $U_{e2}$ at its outputs, which signals have a high frequency in comparison with the mains frequency. The drive circuit could also provide just one of the two signals $U_{e1}$ or $U_{e2}$ to the switched-mode power supply unit 14, in which case it would then be necessary to provide a component in the switched-mode power supply unit in order to generate from the signal $U_{e1}$ or $U_{e2}$ the respective other signal. A typical frequency for the square-wave signals is 50 kHz. The switched-mode power supply unit 14 illustrated by way of example comprises a half-bridge comprising the transistors $T_1$ and $T_2$, two capacitors $C_1$ and $C_2$ and also a transformer Tr, the primary side of which is connected to a point between the two transistors $T_1$, $T_2$, on the one hand, and to a point between the two capacitors $C_1$, $C_2$, on the other hand. The secondary side of the transformer forms the output of the switched-mode power supply unit 14.

The transformer is dimensioned for example for a maximum power of 300 watts. Depending on how many lamps are connected in parallel between the output terminals of the switched-mode power supply unit and/or the power for which the corresponding lamp or the corresponding lamps is or are rated, the input signals 16, 18 must be varied in order to provide a desired root-mean-square value $U_{arms}$ of the output voltage $U_a$, as required by the associated lamp specification, at the output of the switched-mode power supply unit 14. Even slight deviations can lead to a considerable reduction of the service life of the lamp or lamps.

In accordance with the teaching of the prior art, in order to set the desired root-mean-square value $U_{arms}$ of the output voltage $U_a$, the instantaneous root-mean-square value $U_{arms}$ of the output voltage $U_a$ is detected in a detection device 22 and compared with a predetermined reference value 26 in a comparator 23. Depending on the comparison result, a control signal 28 is applied to the drive circuit 20, which leads to the pulse width of the output signal of the drive circuit being modified in the drive circuit 20 in such a way that the root-mean-square value $U_{arms}$ of the output voltage $U_a$ of the switched-mode power supply unit 14 approximates to the reference value 26. The output voltage $U_a$ is regulated via the feedback loop with the components 22, 24, 26 until the root-mean-square value $U_{arms}$ of the output voltage $U_a$ corresponds to the reference value 26. In the event of changes in the operating voltage $U_B$ and associated changes in the root-mean-square value $U_{arms}$ of the output voltage $U_a$, regulation to the reference value is effected in a corresponding manner by means of the aforementioned feedback loop.

The solution according to the prior art has two crucial disadvantages: firstly, the shape of the output voltage $U_a$ is dependent on the load connected between the output terminals of the switched-mode power supply unit, that is to say a change in the load leads not only to a change in the root-mean-square value $U_{arms}$ of the output voltage $U_a$, but also to a change in the signal waveform. Therefore, merely detecting the amplitude of the output voltage $U_a$ does not suffice to determine the root-mean-square value $U_{arms}$ of the output voltage $U_a$. Rather, it is necessary to carry out a genuine root-mean-square value measurement. In view of the high frequency components in the output voltage $U_a$, this means a considerable outlay on circuitry.

Secondly, the safety requirements with regard to the accessibility of the output terminals of the switched-mode power supply unit (SELV) prescribe potential isolation between mains voltage and output voltage $U_a$ (4 kV test). The feedback loop between output voltage $U_a$ and drive circuit 20 would likewise have to satisfy these safety requirements and therefore have to be realized with a transformer or an optocoupler. This would likewise mean an additional outlay on circuitry.

SUMMARY OF THE INVENTION

The present invention is based on the object, therefore, of providing a method by means of which, irrespective of fluctuations in the operating voltage $U_B$ and irrespective of the number of connected incandescent halogen lamps or the power of the connected incandescent halogen lamp(s), the output voltage $U_a$ having the desired root-mean-square value $U_{arms}$ is provided at the output of the switched-mode power supply unit, in conjunction with the lowest possible outlay on circuitry.

Furthermore, the object of the present invention is to provide a circuit for carrying out a method of this type.

These objects are achieved by means of a method having the features in accordance with claim 1 and a circuit having the features in accordance with claim 10.

The particular advantage of the solution according to the invention is that the dependence of the root-mean-square value $U_{arms}$ of the output voltage $U_a$ on the operating voltage $U_B$, the load current $I_L$ and the pulse width PW of the input signal or the input signals of the switched-mode power supply unit, that is to say the recording of the family of characteristic curves, can be performed at the factory using high-quality instruments and the dependencies that have been determined can be stored in an inexpensive memory module which is added to each switched-mode power supply unit. A further important advantage is that the output voltage $U_a$ of the switched-mode power supply unit is not used as the input quantity of the feedback path. The outlay on circuitry for complying with the abovementioned safety requirements for the feedback path is obviated as a result of this.

In a particularly advantageous embodiment of the present invention, in a switched-mode power supply unit having at least two transistors, which are in the on state alternately, for the purpose of determining the amplitude of the load current $I_L$, the voltage dropped across a resistor in the output circuit of one of these at least two transistors while this transistor is in the on state is evaluated. In an even more favourable realization, for the purpose of determining the amplitude of the load current $I_L$, the voltage dropped across the output terminals of one of these at least two transistors on account of the internal resistance of this transistor while this transistor is in the on state is evaluated.

Further advantageous developments of the invention are defined in the subclaims.

An exemplary embodiment is described in more detail below with reference to FIG. 2.

DETAILED DESCRIPTION OF THE INVENTION

Figure 1:
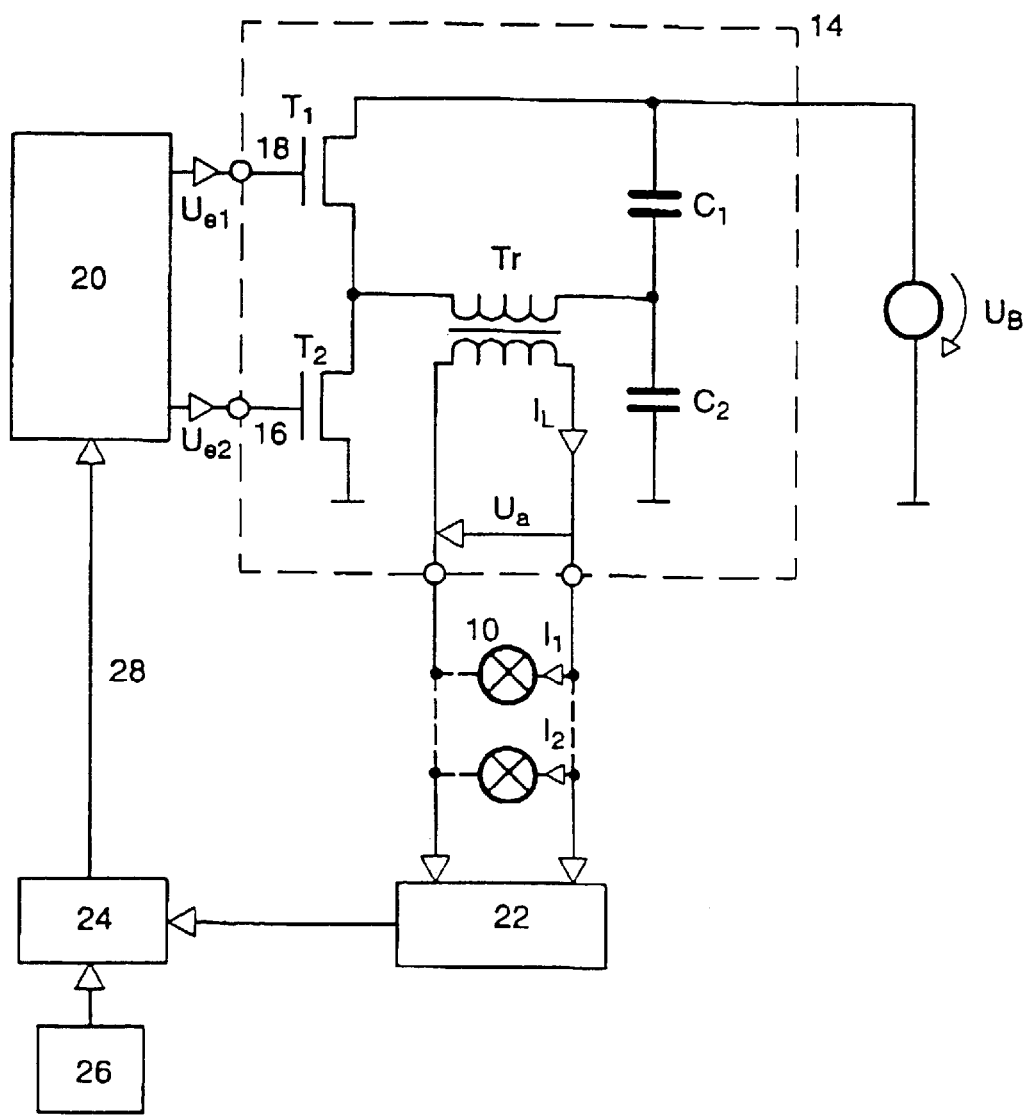
FIG. 1 is a circuit arrangement known from the prior art for operating low-voltage lamps.
Figure 2:
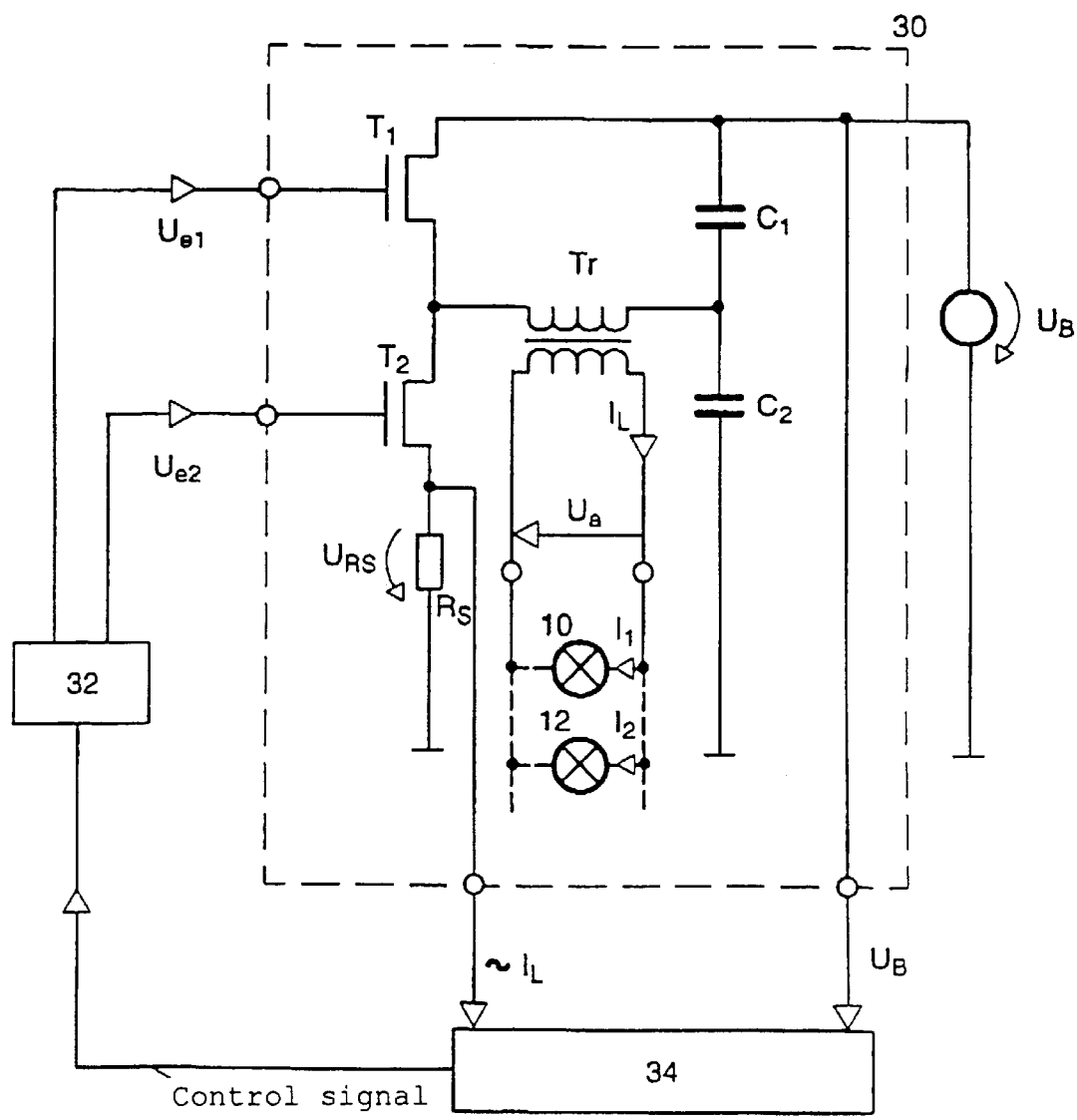
FIG. 2 is a circuit arrangement for operating low-voltage lamps in accordance with the teachings of the present invention.

FIG. 2 illustrates a circuit with which incandescent halogen lamps 10, 12, etc. can be operated, to be precise irrespective of the power of the incandescent halogen lamps 10, 12 and the number of incandescent halogen lamps. By way of example, the switched-mode power supply unit 30 has the components already mentioned in connection with FIG. 1, namely two transistors $T_1$, $T_2$, two capacitors $C_1$, $C_2$ and a transformer Tr, which, as in the prior art in accordance with FIG. 1, is connected to the transistors, the capacitors and the incandescent halogen lamps. Furthermore, the switched-mode power supply unit 30 is connected to an operating voltage $U_B$ in a known manner. The function of the resistor $R_s$ that is additionally arranged between the transistor $T_2$ and earth in an inventive manner in the switched-mode power supply unit 30 will be explained below.

The invention is based on the insight that the output voltage $U_a$ at the output of the switched-mode power supply unit, in particular the root-mean-square value $U_{arms}$ of the said voltage, is principally influenced by two quantities, namely the operating voltage $U_B$ applied to the switched-mode power supply unit, which voltage is generally the mains voltage, and also the load current $I_L$, that is to say the current which corresponds to the sum of the currents $I_1$, $I_2$ through all the incandescent lamps 10, 12, etc. connected to the output of the switched-mode power supply unit. This current $I_L$ changes not only in dependence on the number of incandescent lamps connected to the output of the switched-mode power supply unit but also in dependence on the power of the connected incandescent lamp(s). It is important, moreover, that an incandescent halogen lamp essentially has an only non-reactive resistance during operation—unlike during switch-on.

In a calibration operation to be performed at the factory, the pulse width PW—necessary for a desired root-mean-square value $U_{arms}$ of the output voltage $U_a$ of a signal or signals $U_{e1}$, $U_{e2}$ to be supplied to the switched-mode power supply unit by a drive circuit 32 is recorded in dependence on the operating voltage $U_B$ and on the load current $I_L$ and stored in a family KF of characteristic curves, i.e.

$$PW(U_{arms}=\text{const.})=KF(U_B, I_L)$$

For this purpose, value quadruples are determined, that is to say the associated value of the pulse width PW is determined for different values of $U_B$ and $I_L$ in order to obtain the desired root-mean-square value $U_{arms}$ of the output voltage $U_a$. If a memory 34 is to be used for a wide variety of root-mean-square values $U_{arms}$ of the output voltage $U_a$, this operation can be repeated for these different values of the root-mean-square value $U_{arms}$ of $U_a$. The root-mean-square value $U_{arms}$ is in each case measured using an RF root-mean-square value voltmeter, preferably with a bandwidth of at least 2 MHz. The fact that the root-mean-square value $U_{arms}$ of the output voltage $U_a$ is permitted to deviate by a maximum of +/−0.2 volt from the predetermined specification value during operation of incandescent halogen lamps may serve as a measure for the resolution during the recording of the family of characteristic curves. The determined mutual dependencies of these four parameters, that is to say the points of the family of characteristic curves, are stored in a memory 34 which is added to each switched-mode power supply unit. As input signal of the memory 34, on the one hand the operating voltage $U_B$ is used, or a signal which is proportional to the operating voltage $U_B$, and also a signal which is proportional to the load current $I_L$. In the exemplary embodiment illustrated in FIG. 2, a signal which is proportional to the load current is obtained by a resistor $R_s$ being inserted between the transistor $T_2$ and earth and the voltage $U_{RS}$ dropped across the said resistor being applied to the memory 34. The voltage $U_{RS}$ is proportional to the load current $I_L$. Care must be taken to ensure that in the memory 34 the signal proportional to the load current is evaluated only at an instant at which the transistor $T_2$ is in the on state. In the memory 34, the values of the operating voltage $U_B$ and of the load current $I_L$ are determined, if appropriate with proportionality factors being taken into account, and the pulse width is determined, which, in view of the values determined for $I_L$ and $U_B$, lead to the desired root-mean-square value $U_{arms}$ of the output voltage $U_a$. The desired root-mean-square value $U_{arms}$ of the output voltage $U_a$ may be fixedly predetermined, in which case the recording of the family of characteristic curves for different $U_{arms}$ = const. is obviated during calibration, but may also be fed additionally to the memory 34.

The value for the pulse width determined in the memory 34 is fed to the driver 32, the driver 32 providing, at its output or its outputs, output signals having a correspondingly changed pulse width to the switched-mode power supply unit 30.

In order to react to changes in operating parameters, e.g. in the operating voltage $U_B$, that is to say to ensure the provision of a constant root-mean-square value $U_{arms}$ of the output voltage $U_a$ even in the event of changes in operating parameters or to effect regulation to a constant value of the root-mean-square value $U_{arms}$ of the operating voltage $U_a$, the abovementioned regulating cycle can be repeated at predetermined time intervals.

In further embodiments (not illustrated), a quantity which is proportional to the load current $I_L$ can be determined by evaluation of the voltage dropped across the internal resistance of one of the two transistors in its on state, for example the voltage dropped on account of the internal resistance $R_{DSon}$ if the transistors $T_1$, $T_2$ are realized as field-effect transistors. Other options for measuring the current are known, for example using a current transformer which is looped in instead of the resistor $R_s$, or using a Hall-effect element.

The switched-mode power supply unit 30 illustrated in FIG. 2 comprises a half-bridge circuit. The concept of the invention can readily be applied to a switched-mode power supply unit having a full-bridge circuit. In an extension of the concept of the invention expounded above, variants are also conceivable in which not just one characteristic quantity of the input signal of the switched-mode power supply unit is varied, for example the pulse width above, but also variants in which, by way of example, two or more parameters of the input signal are varied, for example pulse width and frequency.

If the memory 34 is realized as a microcontroller, then the latter can perform further functions, for example a safety shutdown, if the operating voltage and/or the current $I_L$ exceed/s predetermined threshold values. It may also serve for bringing about a soft start of the incandescent halogen lamps, that is to say so-called inrush current reduction, in which the pulsewidth is gradually brought to the desired value. Furthermore, it can be used for controlling the temporal repetition of the regulating cycle.

To operate conventional incandescent halogen lamps, it suffices to record the family of characteristic curves for each range of switched-mode power supply units. For precision instruments, it is also possible to consider recording the family of characteristic curves for each switched-mode power supply unit.

What is claimed is:

1. Method for providing an output signal ($U_a$) having a desired value of a characteristic quantity ($U_{arms}$) at an output of a switched-mode power supply unit, where at least one low-voltage lamp is connected to the output of the switched-mode power supply unit, a load current ($I_L$) corresponds to a sum of the currents ($I^1$, $I_2$) flowing through all the low-voltage lamps, on an input side the switched-mode power supply unit is driven by an input signal ($U_{e1}$, $U_{e2}$) having at least one variable characteristic quantity (PW), and the switched-mode power supply unit is connected to an operating voltage ($U_B$), having the following steps:
   a. in a calibration operation:
      a1. determination of the dependence of the characteristic quantity ($U_{arms}$) of the output signal ($U_a$) on the operating voltage ($U_B$), the load current ($I_L$) and at least one variable characteristic quantity (PW) of the input signal ($U_{e1}$, $U_{e2}$);
      a2. storage of the dependence determined in step a1) in a memory;
   b. during operation:
      b1. determination of characteristic quantities of the load current ($I_L$) and of the operating voltage ($U_B$);
      b2. reading of a value or values of the at least one variable characteristic quantity (PW) of the input signal ($U_{e1}$, $U_{e2}$) in dependence on the values of load current ($I_L$) and operating voltage ($U_B$) determined in step b1) from the memory, which correspond to the desired value of the characteristic quantity ($U_{arms}$) of the output signal ($U_a$); and
      b3. varying of the at least one variable characteristic quantity (PW) of the input signal ($U_{e1}$, $U_{e2}$) to the value(s) read from the memory in step b2).

2. Method according to claim 1, characterized in that in step a1) the load current ($I_L$), the operating voltage ($U_B$) and the characteristic quantity ($U_{arms}$) of the output signal ($U_a$) are varied to predetermined values and a corresponding value or corresponding values of the at least one variable characteristic quantity (PW) of the input signal ($U_{e1}$, $U_{e2}$) is or are determined in order to produce a family of characteristic curves.

3. Method according to claim 1, characterized in that in step b1) an instantaneous values of the characteristic quantities of operating voltage ($U_B$) and load current ($I_L$) are determined.

4. Method according to claim 1, characterized in that in step b1) an instantaneous root-mean-square value of the operating voltage ($U_B$) is determined.

5. Method according to claim 1, characterized in that in step b1) an instantaneous amplitude of the load current ($I_L$) is determined.

6. Method according to claim 5, characterized in that the switched-mode power supply unit comprises at least two transistor ($T_1$, $T_2$), which are in an on state alternately, and the amplitude of the load current ($I_L$) is determined by:
   evaluation of the voltage ($U_{Rs}$) dropped across a resistor ($R_s$) in the output circuit of one of these at least two transistors ($T_1$; $T_2$) while this transistor is in the on state; or
   evaluation of the voltage dropped across the output terminals of one of these at least two transistors ($T_1$; $T_2$) on account of an internal resistance ($R_{DSon}$) of this transistor while this transistor is in the on state; or
   use of a current transformer; or
   use of a Hall-effect element.

7. Method according to claim 1, characterized in that the input signal ($U_{e1}$, $U_{e2}$) is a pulse width-modulated signal and the at least one variable characteristic quantity of the input signal is the pulse width.

8. Method according to claim 1, characterized in that the output signal is a voltage ($U_a$) and the characteristic quantity of the output signal is a root-mean-square value of this voltage ($U_a$).

9. Method according to claim 1, characterized in that steps b1) to b3) are repeated at predetermined time intervals during operation.

10. Circuit for driving at least one low-voltage lamp, comprising:
   a switched-mode power supply unit, at the output of which it is possible to provide an output signal ($U_a$) having a desired value of a variable characteristic quantity ($U_{arms}$) for operating the at least one low-voltage lamp,
   a drive circuit, which is connected to an input of the switched-mode power supply unit and provides an input signal ($U_{e1}$; $U_{e2}$) having at least one variable characteristic quantity (PW) to the switched-mode power supply unit,
   a memory, in which the dependence of the variable characteristic quantity ($U_{arms}$) of the output signal ($U_a$) on the operating voltage ($U_B$), the at least one variable characteristic quantity (PW) of the input signal ($U_{e1}$, $U_{e2}$) and on a load current ($I_L$) is stored and the output of which is connected to the drive circuit, the load current ($I_L$) being a sum of currents ($I_1$, $I_2$) flowing through all the low-voltage lamps during operation; and
   devices for determining characteristic quantities of the operating voltage ($U_B$) and of the load current ($I_L$), the outputs of these devices being connected to the input of the memory.

11. Circuit according to claim 10, characterized in that the determining devices determine instantaneous values of the characteristic quantities of the operating voltage ($U_B$) and the load current ($I_L$).

12. Circuit according to claim 9, characterized in that the determining devices determine an instantaneous root-mean-square value of the operating voltage ($U_B$) and the instantaneous amplitude of the load current ($I_L$).

13. Circuit according to claim 9, characterized in that the switched-mode power supply unit comprises at least two transistor ($T_1$, $T_2$), which are in an on state alternately, and, in order to determine the load current, provision is made of the following:

a resistor ($R_S$) in the output circuit of one of these at least two transistors; or a current transformer; or a Hall-effect element.

14. Circuit according to claim 9, characterized in that the input signal ($U_{e1}$, $U_{e2}$) applied to the switched-mode power supply unit by the drive circuit is a pulse width-modulated signal and the at least one variable characteristic quantity of the input signal is the pulse width.

15. Circuit according to claim 9, characterized in that the output signal is a voltage ($U_a$) and the characteristic quantity of the output signal is the root-mean-square value of this voltage ($U_a$).

* * * * *